US011144538B2

(12) United States Patent
Li et al.

(10) Patent No.: US 11,144,538 B2
(45) Date of Patent: Oct. 12, 2021

(54) PREDICTIVE DATABASE INDEX MODIFICATION

(71) Applicant: International Business Machines Corporation, Armonk, NY (US)

(72) Inventors: Shuo Li, Beijing (CN); Xiaobo Wang, Beijing (CN); Ping Liang, Beijing (CN); Min Li, Beijing (CN); Ping Wang, San Jose, CA (US); Jeffrey William Josten, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 16/412,637

(22) Filed: May 15, 2019

(65) Prior Publication Data
US 2020/0364211 A1 Nov. 19, 2020

(51) Int. Cl.
G06F 7/00 (2006.01)
G06F 16/23 (2019.01)
G06N 5/04 (2006.01)
G06F 16/22 (2019.01)

(52) U.S. Cl.
CPC ...... G06F 16/2379 (2019.01); G06F 16/2272 (2019.01); G06N 5/04 (2013.01)

(58) Field of Classification Search
CPC .... G06F 16/2379; G06F 16/2272; G06N 5/04
USPC .................................................. 707/600–899
See application file for complete search history.

(56) References Cited

U.S. PATENT DOCUMENTS

| 8,832,036 | B2 | 9/2014 | Ming |
| 2017/0300517 | A1 | 10/2017 | Saghi |
| 2017/0351721 | A1* | 12/2017 | le Mar ............. G06F 16/24542 |

OTHER PUBLICATIONS

P. Mell, et al. "The NIST Definition of Cloud Computing", NIST Special Publication 800-145, Sep. 2011, Gaithersburg, MD.
J. Campbell "DB2 for z/os Optimizing Insert Performance" 2010. "Improving Insert Performance" https://www.ibm.com/support/knowledgecenter/SSEPGG_10.5.0/com.ibm.db2.luw.admin.perf.doc/doc/c0009677.html.

* cited by examiner

Primary Examiner — Isaac M Woo
(74) Attorney, Agent, or Firm — Stephanie Carusillo; George S. Blasiak; Heslin Rothenberg Farley & Mesiti PC

(57) ABSTRACT

Methods, computer program products, and systems are presented. The method computer program products, and systems can include, for instance: examining data of breaches of a geofence by client computer devices to determine respective positions of the breaches; receiving by a database system transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data.

20 Claims, 12 Drawing Sheets

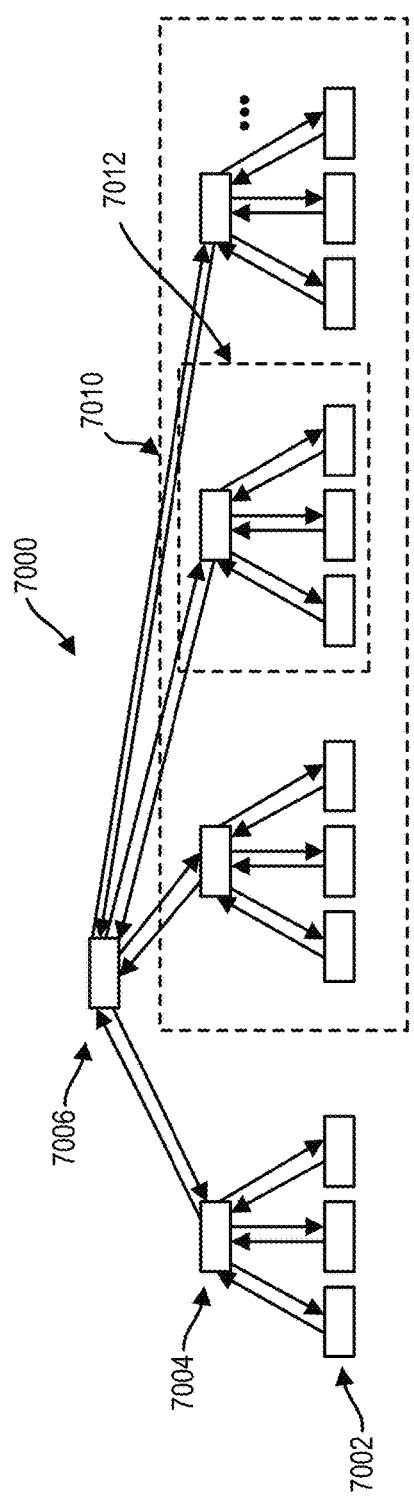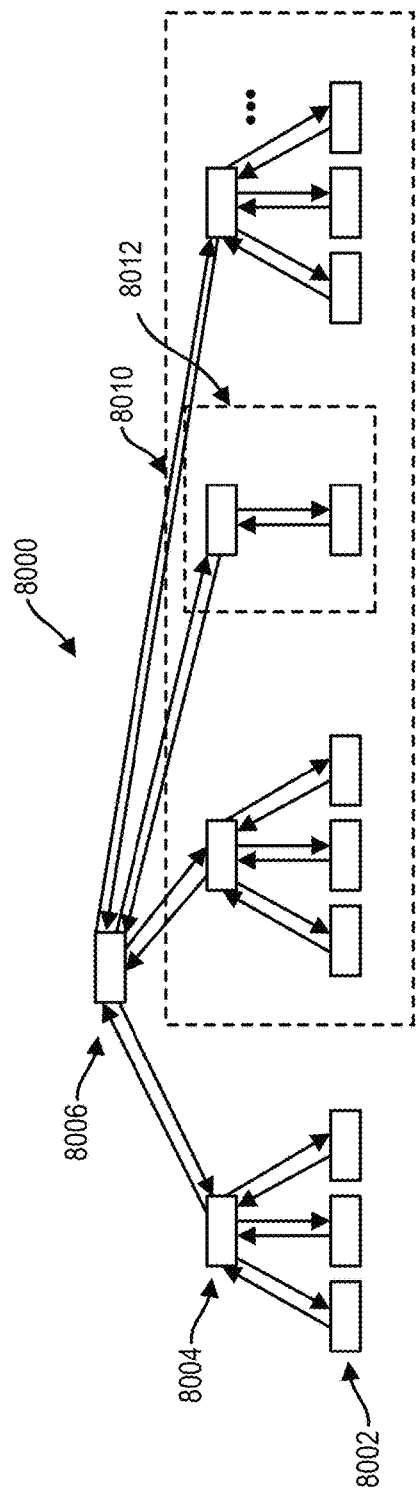

PREDICTIVE DATABASE INDEX MODIFICATION

BACKGROUND

The present disclosure relates to databases and particularly to operations for databases.

Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table.

Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table.

A Database index is a database data structure that can be used for improving performance of database operations, such as the aforementioned INSERT, UPDATE, SELECT, and DELETE operations that can be performed with use of SQL statements. A database table index can be characterized by a hierarchical structure having leaf pages at a lowest level leaf pages, intermediary (non leaf) pages at one or more intermediary level of hierarchy and a highest level of hierarchy consisting of a root page.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed (Samuel).

SUMMARY

Shortcomings of the prior art are overcome, and additional advantages are provided, through the provision, in one aspect, of a method. The method can include, for example: receiving by a database system transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data.

In another aspect, a computer program product can be provided. The computer program product can include a computer readable storage medium readable by one or more processing circuit and storing instructions for execution by one or more processor for performing a method. The method can include, for example: receiving by a database system transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data.

In a further aspect, a system can be provided. The system can include, for example a memory. In addition, the system can include one or more processor in communication with the memory. Further, the system can include program instructions executable by the one or more processor via the memory to perform a method. The method can include, for example: receiving by a database system transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 is a schematic diagram illustrating predictive modification of an index according to one embodiment;

FIG. 8 is a schematic diagram illustrating predictive modification of an index according to one embodiment;

DETAILED DESCRIPTION

Figure 1:
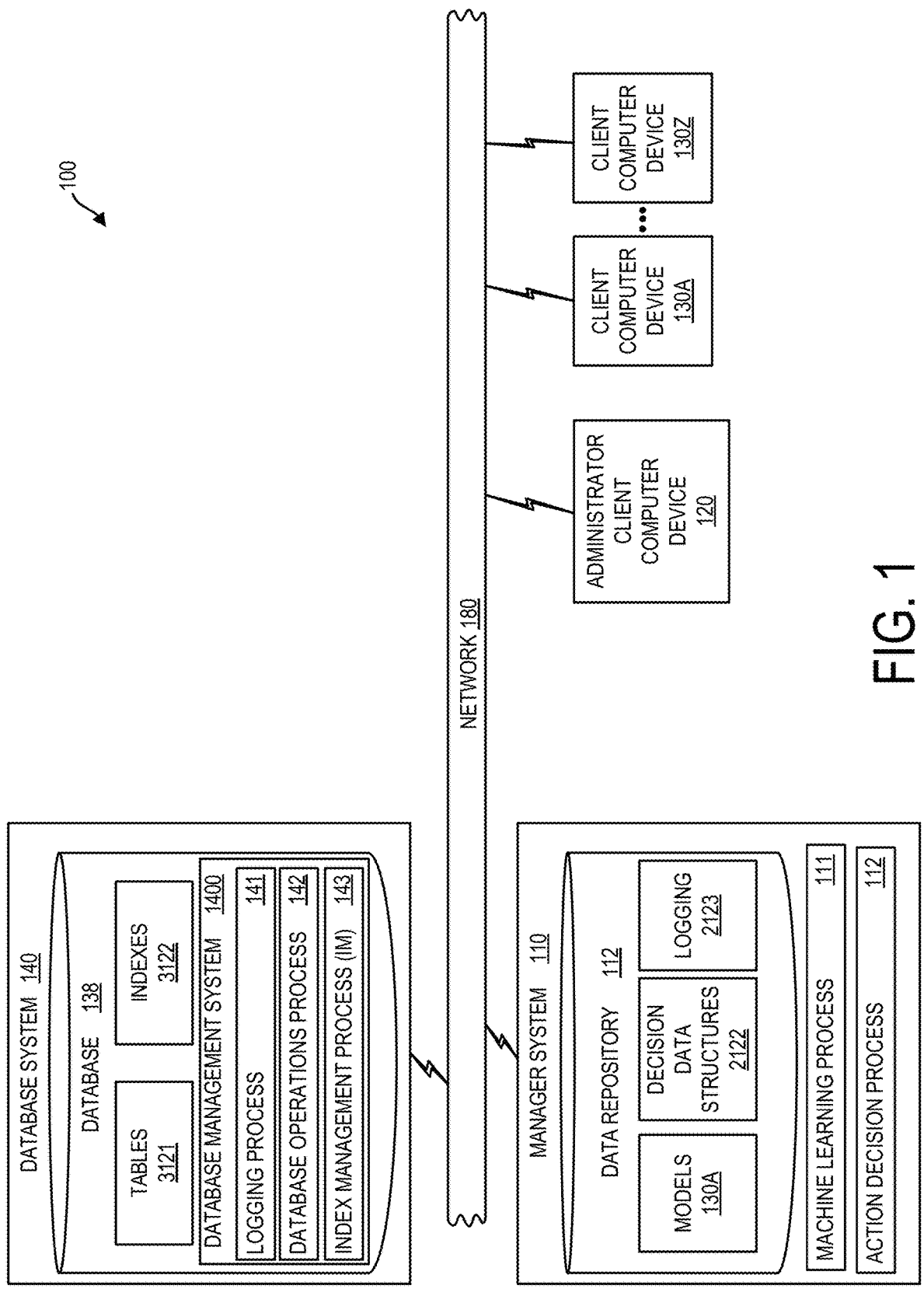
FIG. 1 depicts a system having a manager system, client computer devices, an administrator client computer device, and a database system according to one embodiment.

System 100 for use in improving response time of databases is set forth in one embodiment in FIG. 1. System 100, according to one embodiment, can include manager system 110 having an associated data repository 108, administrator client computer device 120, client computer devices 130A-130Z, and database system 140. Manager system 110, administrator client computer device 120, client computer devices 130A-130Z, and database system 140 can be provided by computing node based devices and systems and can be in communication with one another via network 180, according to one embodiment. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

According to one embodiment, each of manager system 110, administrator client computer device 120, client computer devices 130A-130Z, and database system 140 can be external to one another, e.g. located on different computing nodes, e.g. different physical computing nodes. According to one embodiment, one or more of manager system 110, administrator client computer device 120, client computer devices 130A-130Z, and database system 140 can be collocated at least one of manager system 110, administrator client computer device 120, client computer devices 130A-130Z, or database system 140.

According to one embodiment, database system 140 can be provided by a Structured Query Language (SQL) database system that is able to respond to SQL based query statements. In the course of use of system 100, database system 140 can receive queries from one or more client computer devices of client computer devices 130A-130Z. Queries received by database system 140 can take the form of query statements such as SQL statements. Database system 140 can include database 138 and database management system (DBMS) 1400. Database 138 can include tables 3121 and indexes 3122. Tables 3121 can logically organize data into columns and rows of data. A row of data within a table can define a record. Each table of tables 3121 can have associated thereto zero or more indexes of indexes 3122.

A database table index refers to a data structure that can improve the speed of database operations such as database INSERT, UPDATE, SELECT, and DELETE operations. A database table index can be can be represented by a B tree diagram and can be characterized by a lowest level referred to as a leaf page level, one or more intermediate level, and a highest level referred to as a root page level consisting of a root page.

Database system 140 can include database management system (DBMS)1400 which runs various processes such as logging process 141, database operations process 142, and an index management process 143. Index management process 143 can define an index manager (IM). DBMS 1400 running logging process 141 can generate logging data, which can include transaction logging data, which specifies a history of actions executed by a DBMS 1400. DBMS 1400 running logging process 141 can generate logging data in the form of trace event logging data. DBMS 1400 can generate index action logging data based on transaction logging data of received queries. Logging data can include data returned from status commands such as a Database Console Command (DBCC) command. One command that can be used to generate logging data in SQL ins the DBCC PAGE command which can return data on indexes and pages created by DBMS 1400. DBMS 1400 running database operations process 142 can include DBMS 1400 executing database operations, such as INSERT, UPDATE, SELECT, and DELETE operations.

DBMS 1400 running index management process 143 can generate new indexes for tables so that each table of database system 140 has associated thereto zero or more indexes. Indexes associated with tables can improve the performance of operation with respect to such tables, e.g. can reduce the time required for responding to a query operation. DBMS 1400 running index management process 143 can include DBMS 1400 generating new indexes for tables and, e.g. new leaf pages for indexes. DBMS 1400 can generate zero or more indexes per table. DBMS 1400 running index management process 143 can include DBMS 1400 examining incoming INSERT statement data queries and based on a determination that a current leaf page has insufficient free space to store a new record, can execute an index split operation. An index split operation can include, e.g. allocating a leaf page from a page store, linking related pages to the leaf pages, and copying data from the current leaf page to the newly allocated leaf page. Index management process 143 can define an index manager (IM).

An index can be defined for a column of a table. The column for which a table index is defined can be referred to as a key column (key) for the index and the values of the column can be referred to as column values (key values). When an index is defined, index manager (IM) can create leaf pages for storage of records of the table. The pages can be ordered in accordance with an order of column values (key values) of the column for which the index is defined. That is for the column "city" records for cities beginning with the letter "B" can be associated to leaf pages ordered after leaf pages associated to cities beginning with the letter "B". For the column "transaction ID" records for transaction IDs beginning with 002 . . . can be associated to leaf pages ordered after leaf pages associated to transaction IDs beginning with 001 . . . ". Leaf pages can be assigned unique addresses defining their order.

In a clustered index, leaf pages store one or more data record. In a non-clustered index, a leaf page can have pointer(s) pointing the data page(s) storing data records. Clustered indexes can sort and store the data rows in the table based on key values of an index definition. Because the data rows themselves can be stored in only one order there can be defined according to one embodiment one clustered index per table. Non-clustered indexes have a structure separate from the data rows. A non-clustered index can contain non-clustered index key values and each key value entry can have a pointer to the data row that contains the key value.

In SQL, database data can be stored in logically divided memory locations known as pages. Pages are 8 kb in size and are defined in various types including data pages and index pages. Pages can include a page header, data rows and a row offset array. The header of a page can include a field that specifies an amount of free space on a page.

Embodiments herein recognize that while indexes can improve operations of a database, certain index actions can consume significant resources, and can increase database response time. Embodiment herein recognize that when a DBMS performs an insert operation, the DMBS examines a free space field of a page on which a record is to be stored and if there is insufficient free space and index manager (IM) can perform an index split. An index split can include the following actions (a) allocating a page for page store for performance of the index split, (b) linking the new page to related pages of the index (e.g. sibling pages and a parent page, and (c) copying page split data e.g. record data from a pre-existing page to the new page.

Embodiments herein recognize that index split operations can consume significant resources. Resource consuming actions associated to an index split can include (a) allocating a new leaf page (b) linking the new page into and index tree (e.g. referencing it to parent and sibling nodes), (c) copying page split data to the new leaf page and also performing logging operations to log the change.

Components of index split response time associated to an index split action can include, e.g. CPU time, Internal Resource Lock Manager (IRLM) lock and latch time, system latch time, database I/O time, log write I/O time, other read I/O time, other write I/O time, open/close time, extend/delete/define time, page latch time, and global contention time. Embodiments herein recognize that a time to perform system latch in the case of an index split can be significant, consuming, e.g. on the order of, e.g. over about 0.02 seconds for insert of 10M records in a 5 index table. Embodiments herein recognize that latencies associated with index splits can increase as additional indexes are defined for a table.

Manager system 110 can be configured to improve performance of database system 140. Manager system 110 according to one embodiment database system 140 generates one or more new leaf pages and/or non-leaf pages within an index in response to determining that a record storing page for storing indexed column records has insufficient free space to store one or more incoming record.

Manager system 110 can include data repository 108 and can run various processes, such as machine learning process 111 and action decision process 112. Data repository 108 can store in models area 2121 various predictive models for use in predicting actions associated to a database such as index generation actions performed by an index manager with respect to a database table. Predictive models of models area 2121 can be trained using machine learning processes using training data. Supervised machine learning processes can be implemented, wherein the predictive model predicts an index change classification with respect to a database table. Data repository 108 can store in decision data structures area 2122, decision data structures for use and return of action decisions. According to one embodiment, decision data structure of decision data structures area 2122 can cognitively map index change patterns to action decision associated to the respective index change patterns. Data repository 108 in logging area 2123 can store logging data. The logging data can include, e.g. transaction history logging data and index change logging data. Manager system 110 can use logging data of logging area 2123 for training of predictive model stored in models area 2121.

Manager system 110 running machine learning process 111 can train predictive models stored in models area 2121. Training data used to train a predictive model can include logging data of logging area 2123. Manager system 110 running action decision process 112 can return action decisions. According to one embodiment, manager system 110 running action decision process 112 can use one or more decision data structures stored in decision data structures area 2122 for return of action decisions.

Action decision returned by action decision process 112 can include database action decisions, such as action decision to: (i) proactively and asynchronously initiating creation of a leaf page for storing leaf split data from an existing leaf page; and (ii) aggressively initiating creation of multiple index leaf pages in response to a determination that a record storing page for storing indexed column data has insufficient free space to store an incoming record.

Figure 2:
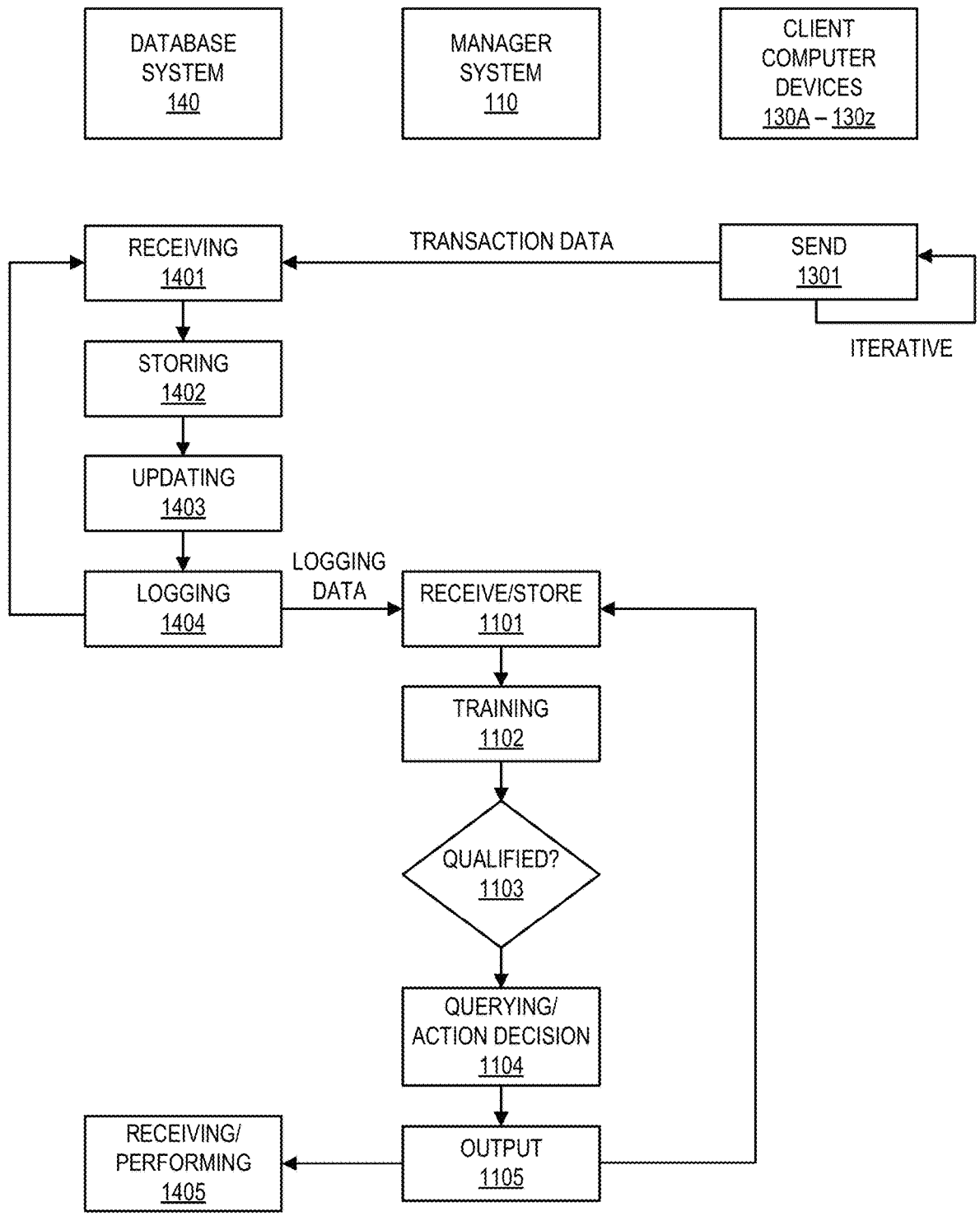
FIG. 2 is a flowchart illustrating a method for performance by a manager system interoperating with a database system and client computer devices according to one embodiment.

Referring to the flowchart of FIG. 2, a method for performance by database system 140 interacting with manager system 110 and client computer devices 130A-130Z is described. At block 1401, database system 140 can be receiving transaction data from client computer devices 130A-130Z which can be sending request data iteratively at block 1301. Transaction data can include, e.g. insert query data defining a request to insert a data record into a certain database table. In response to the receiving of transaction data at block 1401, database system 140 can proceed to block 1402 to perform storing of a record of the request data into a determined location of a memory.

For storing of a record defined within transaction data received at block 1401, DBMS 1400 can use an index in order to search for a page that specifies sufficient free space for insertion of the data record and database system 140 in response to the identification of a page specifying sufficient free space can responsively store the data.

At block 1403, in response to completion of block 1402, database system 140 can perform updating of an index associated with a table in which a record is stored. In response to completion of block 1403, database system 140 can proceed to block 1404 to perform logging of actions associated to the performing of blocks 1402 and 1403. DBMS 1400 of database system 140 can generate logging data at block 1404.

Logging data generated by database system 140 at block 1404 can include transaction logging data, i.e. data specifying attributes of the received request data received at block 1401 and index logging data specifying, e.g. the generation of new indexes and/or the generation of pages within an index. In response to completion of block 1404 database system 140 can send logging data generated at block 1404 for receipt and storage by manager system 110 at block 1101.

While logging data is transmitted at block 1404, database system 140 can iteratively return to block 1401 to iteratively perform receiving of new request data, e.g. from other client computer devices of client computer devices 130A-130Z. It can be seen from the flowchart of FIG. 2 that database system 140 can be iteratively performing the loops of blocks 1401-1404. Manager system 110 at block 1101 can perform receiving and storing of logging data received at block 1101. Manager system 110 can store logging data into logging data area 2123 of data repository 108 associated to manager system 110. On completion of block 1101, manager system

110 can responsively proceed to block 1102 to perform training of one or more predictive model using received and stored logging data.

Figure 3:
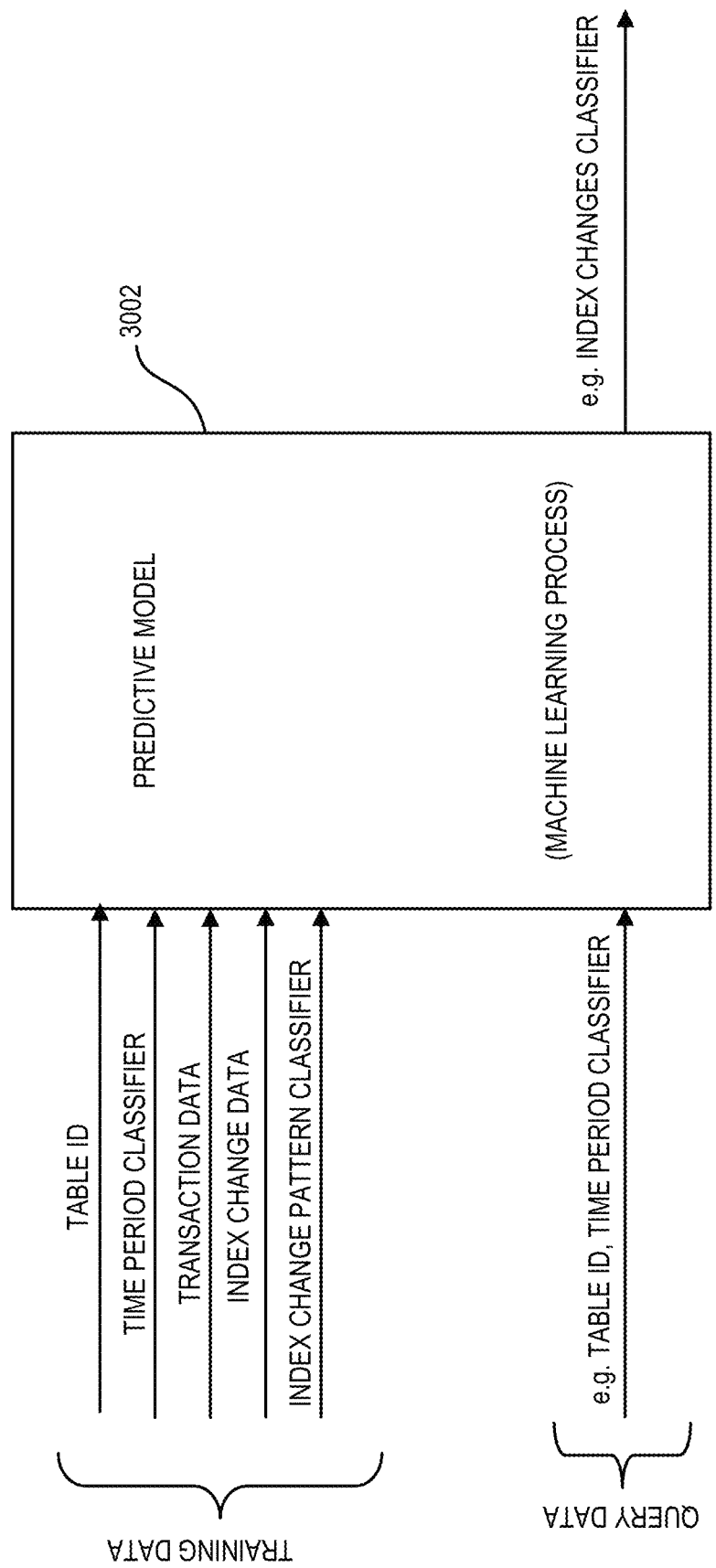
FIG. 3 is a schematic diagram illustrating training of a predictive model according to one embodiment.

FIG. 3 illustrates predictive model 3002 trained using machine learning processes. Predictive model 3002 can be trained with use of applied training data and predictive model 3002, once trained, can be responsive to query data to return prediction specifying data. Training of predictive model 3002, according to one embodiment, is illustrated in FIG. 3. Training data can be applied to predictive model 3002 on a per time period of interest bases. Applied training data applied to predictive model 3002 can include, e.g. (a) a table ID, (b) a time period classifier (e.g. one day, one hour, etc.), (c) transaction data, (d) index change data, and (e) an index change classifier. The training data (a)-(e) can be provided by logging data and the training data element (e) can be, e.g. an administrator observed index change classifier associated to the training data.

According to one embodiment, predictive model 3002 once trained can predict the performance of a database table over the course of a predetermined time period corresponding to the time period of interest of the training set interval, e.g. over the course of an hour, a day, a month, and the like. System 100 can include for a given table, multiple predictive models 3002, e.g. each being trained to predict performance of a table over a different time period of interest. For example, one instance of predictive model 3002 can be trained for predicting performance of a table over the time period of an hour, whereas a second instance of predictive model 3002 can be trained to predict performance of a table over the course of a day, and a third instance of predictive model 3002 can be trained to predict performance of a table of the course of a week, and so on.

Referring to input training data defining a training dataset for a time period of interest, training data can include a table ID which can be extracted from logging data generated from transaction data. A time period classifier can specify the time period of interest and other time period information, e.g. in the case of a day time period of interest, whether the day to which training data pertains is a workday day or alternatively a weekend/holiday day. Transaction data applied as training data can be defined by transaction logging data specifying incoming requests to a table, such as incoming data insert requests. Index change data can be defined by logging data that specifies table index actions, such as actions to create new indexes and/or actions to create new pages within an index. The training dataset indicated in FIG. 3 can be applied once per time period of interest, e.g. once per day if the relevant time period of interest for training of predictive model 3002 is one day. Based on the input training data elements (a)-(d) associated with the supervised learning outcome element, (e), predictive model 3002 can be trained by machine learning to learn patterns such transaction patterns and index change patterns.

Predictive model 3002, once trained with use of training data can respond to query data to return an output. An output can include an index change classifier data and other prediction specifying data specifying one or more predicted change of a database table under normal operation of an index manager (IM). Query data that can be applied to predictive model 3002 for return of an index change classifier can include, e.g. (a) a table ID, (b) a time period classifier, and/or (c) transaction data. Table 4000 illustrates various index pattern change classifications that can be returned with use of a trained predictive model such as predictive model 3002.

Figure 4:
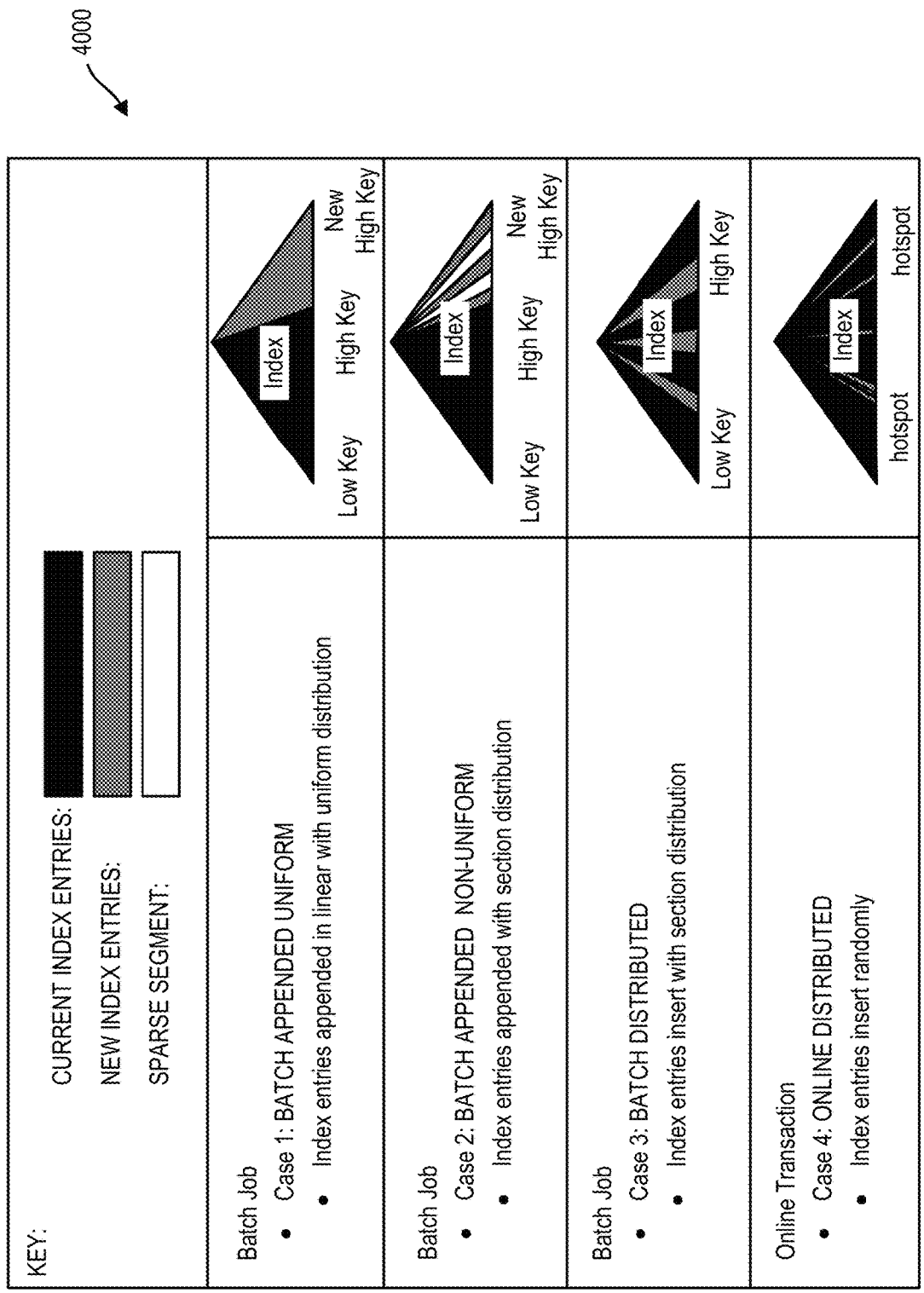
FIG. 4 is a schematic diagram illustrating index change patterns according to one embodiment.

An index associated to a table can include a change pattern. Representative change patterns are described with reference to Table 4000 as depicted in FIG. 4. The depicted cases, case 1, case 2, and case 3 are batch job cases, whereas case 4 is an online transaction case. According to case 1, there is depicted a linear appended index in which new pages defining an index are appended at an end of a current index structure. An index manager (IM) can append index entries to an index in a linear manner with uniform distribution as shown in case 1. Embodiments herein recognize that the index change pattern as depicted in case 1 wherein new index pages are appended at a current end of an index can be present wherein new values of a column on which an index is defined are expected to increase over time. According to one example, the column of interest can be a timestamp column, wherein the values of the column (the timestamp values) are expected to increase over the course of new record entries. According to one example, the column of interest can be a transaction ID associated to an entity that allocated transaction IDs for new transactions in a serially ordered manner. In such an example the values of the column (the transaction ID values) are expected to increase over the course of new record entries.

Referring to case 2, case 2 depicts another case wherein new pages defining an index are appended at a current end of an index. The index change pattern of case 2 is differentiated from case 1 in that the pattern of new pages is not uniform, e.g. can be characterized by sparse index segments followed non-sparse segments. According to one example, an index can be defined on a timestamp value, and transactions can be sent in a batch manner characterized by loading periods followed by break periods (e.g. lunchtime break).

According to case 3, an index manager can insert index entries with section distribution, i.e. new pages defining the index may not all be appended to an end of a current index, but rather may be distributed within an index at a location intermediate of a current first leaf page and current last page of a current index. According to one example, an index can be defined on the column "city" and new incoming transactions can specify cities that have previously been specified in column rows of the column.

According to case 4, case 4 illustrates an online transaction index change pattern wherein an index manager can create new pages for an index with random distribution. In one example a column on which an index is defined can be a "city" column and new incoming transactions can specify cities pre-existing within column rows.

For any given time period of interest, various logging data can be used to identify index change patterns as indicated in FIG. 4. According to one example, manager system 110 can generate index logging data based on transaction logging data. That is, manager system 110 with knowledge of page size (8 kb in SQL), record sizes, and page split conditions, can generate index action data specifying e.g. a location and number of page splits over a time period of interest based on transaction logging data.

Subsequent to applying training data for training predictive model 3002 at block 1102, manager system 110 at block 1103 can determine whether there is an available predictive model that has been trained by manager system 110 that is sufficiently trained to perform a prediction. Manager system 110 can apply one or more criterion at block 1103. One criterion can be the criterion that training data, for more than a threshold number of timing periods has been applied to a predictive model. On the determining that there is one or more predictive model sufficiently trained, manager system 110 still referring to the flowchart of FIG. 2, can proceed to block 1104.

At block 1104, manager system 110 can query qualified predictive models for return of prediction specifying data that specifies predicted index change attributes for a next time period of interest. Data specifying an index change pattern classifications associated to tables of a database, which according to received logging data received at block 1101, are currently experiencing index updates. Querying at block 1104 can include querying of one or more predictive model, such as predictive model 3002 for return of prediction specifying data that specifies predicted index changes for a next time period of interest. Prediction specifying data can include data that specifies a predicted index change pattern for a next time period of interest under normal operation by an index manger (IM), a predicted number of added intermediate page(s) and location of such page(s) for a next time period of interest, and a predicted number of added leaf page(s) and locations of such page(s) for a next time period of interest under normal operation by an index manager (IM). Manager system 110 can use the returned prediction specifying data for return of an action decision.

For return of an action decision using returned prediction specifying data returned by querying predictive model 3002, manager system 110 at block 1104 can query a decision data structure, such as the decision data structure set forth in Table A.

TABLE A

| Row | Predicted Index pattern Change classifier | Predicted Added intermediate page(s) | Predicted Added leaf page(s) | Action decision |
|---|---|---|---|---|
| 1 | Batch Appended Uniform | Count: xx; Level(s): xx; Location(s): xx | Count: xx; Location(s): xx | Proactively and asynchronously initiating creating of leaf page(s) to accommodate expected transactions |
| 2 | Batch Appended Uniform | — | — | Proactively and asynchronously initiating creation of single appended leaf page |
| 3 | Batch Appended Non-Uniform | Count: xx; Level: xx; Order: xx | Count: xx; Location(s): xx | Proactively and asynchronously initiating creation of added leaf page(s) to accommodate expected transactions |
| 4 | Batch Appended Non-Uniform | — | — | Proactively and asynchronously initiating creation of single appended leaf page |
| 5 | Batch Distributed | Count: xx; Level(s): xx; Location(s): xx | Count: xx; Location(s): xx | Proactively and asynchronously initiating creation of added leaf page(s) to accommodate expected transactions |
| 6 | Batch Distributed | — | Count: xx > 1; | Wait for index split to be initiated in response to page free space check by IM; synchronously allocate one or more additional leaf page for performing index split in response to free space deficiency determination. |
| 7 | Online distributed | Count: xx; Level(s): xx; Location(s): xx | Count: xx; Location(s): xx | Proactively and asynchronously initiating creation of added leaf page(s) to accommodate expected transactions |
| 8 | Online distributed | — | Count: xx > 1; | Wait for index split to be initiated in response to |

TABLE A-continued

| Row | Predicted Index pattern Change classifier | Predicted Added intermediate page(s) | Predicted Added leaf page(s) | Action decision |
|---|---|---|---|---|
| | | | | page free space check by IM; synchronously allocate one or more additional leaf page for performing index split in response to free space deficiency determination. |

Referring to the decision data structure of Table A, manager system 110 at block 1104 can return an action decision in dependence on prediction specifying data which can include a predicted index change classifier and, in some embodiments further in dependence on additional prediction specifying data including predicted index change attributes such as indicated in Table A e.g. including data of predicted added intermediate page(s) and predicted added leaf page(s).

Referring to Row 1 of Table A, when Row 1 is fired, manager system 110 can return the action decision of proactively and a asynchronously initiating creating additional index leaf page(s) to accommodate expected transactions of a next time period of interest. Manager system 110 asynchronously initiating creation of additional index leaf page(s) is depicted in FIG. 5.

Figure 5:
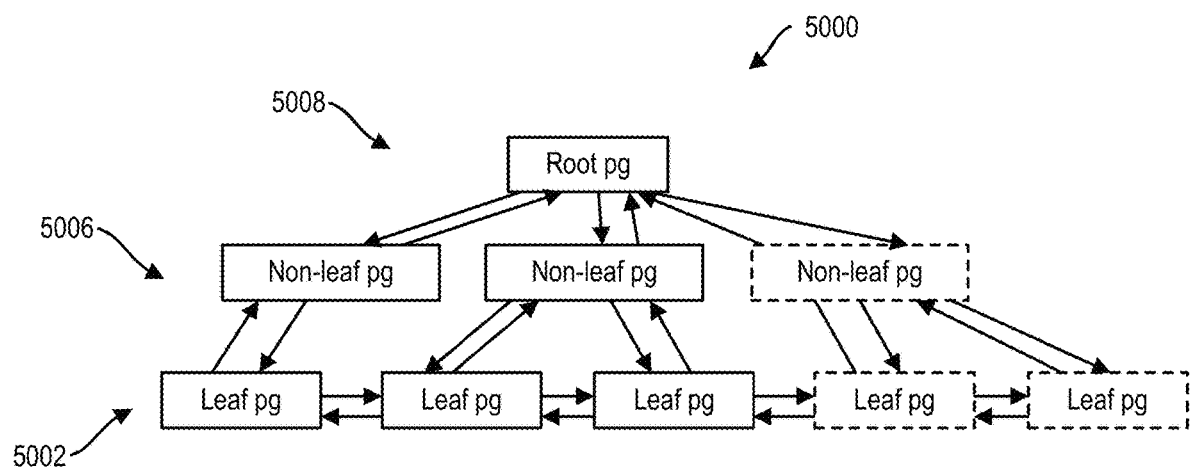
FIG. 5 is a schematic diagram illustrating predictive modification of an index according to one embodiment.

Referring to FIG. 5, index structure 5000 can include leaf page layer 5002, intermediate page layer 5006, and root page layer 5008 consisting of a root page. Referring to layer 5002 and Row 1 of Table A, a returned action decision can be the action decision to initiate creation of one or more additional leaf page(s) which can consist, e.g. of two leaf pages indicated in dashed form in FIG. 5. Referring to layer 5006, it is understood that index structure 5000 can include additional intermediate page layers 5006, if a table is larger, or zero intermediate page layers 5006 if a table is smaller. Referring to Row 1 of the decision data structure of Table A, the returned action decision can depend on a predicted number of added leaf page(s) predicted to be added by an index manager (IM) during a next time period in the absence of features herein. FIG. 5 depicts an index structure 5000 in the case the predicted number of added leaf pages is 2.

Figure 6:
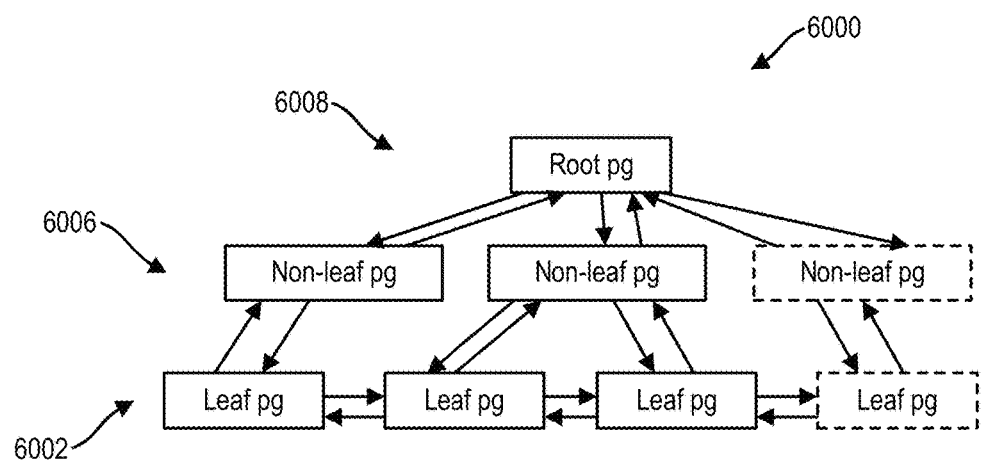
FIG. 6 is a schematic diagram illustrating predictive modification of an index according to one embodiment.

In FIG. 6 there is depicted index structure 6000, wherein the case that the predicted number of added leaf pages for a next time period is 1 and not 2. Index structure 6000 of FIG. 6 can include leaf page layer 6002, intermediate page layer 6006, and root layer 6008 consisting of a root page.

Referring to Row 1 of the decision data structure of Table A, manager system 110 can return an action decision to proactively and asynchronously initiate creation of a single leaf page to accommodate expected transactions during a next time period in the case that the predicted added leaf pages column of Table A specifies in Row 1 a predicted count of added leaf pages of 1. In the index structure 6000 of FIG. 6, the leaf page of layer 6002 of which creation is proactively initiated, is depicted in dashed form together with its associated non-leaf page of layer 6006 indicated in FIG. 6 in dashed form. The asynchronous and proactive initiation of leaf page creation can be prior to and asynchronous with respect to a determination that one or more record storing page for storing transaction data has insufficient free space to store an incoming record for insert into a table with receipt of transaction data defined by an insert query. Proactively initiating creation of a leaf page can include one or more of (a) allocating the one or more leaf page to the index from a page store, (b) linking the one or more leaf page to related leaf pages of the index, and (c) copying page split data from an existing one or more leaf page of the index to the one or more leaf page.

According to one embodiment, action (a) (but not (b) and (c)) is initiated to allocate a page from a page repository asynchronously prior to a normal operation index split triggering condition based each time Row 1 is fired. According to one embodiment, actions (b) in addition to (a) is performed asynchronously prior to a normal operation index split triggering condition based on the condition that the confidence level associated to the predicted added leaf pages column of Table A is above a first threshold. According to one embodiment, actions (b) and (c) in addition to (a) are performed proactively and asynchronously prior to a normal operation index split triggering condition based on a determination that a confidence level associated to the prediction of the predicted added leaf pages column of Row 1 exceeds a second threshold, the second threshold being greater than the first threshold. The normal operation index split triggering condition can be the condition that an index manager (IM) that a record storing page storing indexed data has insufficient free space to store an incoming record.

There is set forth herein according to one embodiment receiving by a database system 140 transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data. According to one embodiment, the prediction specifying data specifies a classifier of an index change pattern, and wherein the modifying includes proactively modifying the index using the classifier of the index change pattern. According to one embodiment, the prediction specifying data specifies a count of leaf pages predicted to be added, and wherein the modifying includes proactively initiating creation of one or more leaf page for the index according to the count. According to one embodiment, the modifying includes proactively allocating one or more leaf page for accommodation of page split data of a certain page of the index. According to one embodiment, the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data. According to one embodiment, the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data, the proactively initiating creating including performing, prior to the determination that free space of one or more certain leaf page of the index is insufficient to store incoming transaction data, one or more of (a) allocating the one or more leaf page to the index from a page store, (b) linking the one or more leaf page to related leaf pages of the index, and (c) copying page split data from an existing one or more leaf page of the index to the one or more leaf page.

Referring to Row 2 of the decision data structure of Table A, embodiments herein recognize that predictive model 3002 in some scenarios may not return prediction specifying data with an associated threshold exceeding level of confidence sufficient to return a prediction to specify predicted counts or locations of added intermediate pages and/or added leaf page(s). Notwithstanding in such scenarios for the less querying of predictive model 3002 can be sufficient to return the prediction with a threshold exceeding level of confidence that an index manager (IM) in a next time period of interest under normal operation will append at least one leaf page to an existing index in accordance with a batch index change pattern. Under such a scenario, manager system 110 can fire Row 2 in the decision data structure of Table A (batch appended index change classifier, insufficient data to predict added page count or location). Referring to Row 2 of the decision data structure of Table A, when Row 2 is fired, the action decision can be returned as specified in Table A to proactively and asynchronously initiate creation of a single appended leaf page. Accordingly, when Row 2 is fired, manager system 110 can initiate the creation of a changed index structure as depicted in index structure 6000 of FIG. 6, wherein manager system 110 initiates creation of a single leaf page indicated by the dashed leaf page of layer 6002.

Embodiments herein recognize that a response time of a database undergoing index splits can be significantly attenuated. In the absence of features herein, an index split performed by an index manager (IM) can result in attenuated response time in that the index manager (IM) must (a) allocate a new leaf page from a page store; (b) link the new leaf page to related nodes of the index structure; and (c) copy data from an existing leaf page to the newly created leaf page synchronously and in response to a determination by the index manager (IM) that one or more record storing page for storing transaction data has insufficient free space to store an incoming record for insert into a table with receipt of transaction data defined by an insert query. By implementation of features herein one or more of the actions (a), (b), and (c) described herein can be performed asynchronously prior to a time that an existing record storing page is determined to have insufficient free space to accommodate incoming transaction data. Because one or more of the actions (a), (b), and (c) has been completed at the time of determination that an existing page is has insufficient free space to store incoming transaction data, response time in the case of a determination that an existing page has insufficient free space to store incoming transaction data is improved. System 100 can be configured so that manager system 110 asynchronously initiates creation of an additional leaf page for performance of an index split prior to and asynchronously with respect to a determination that a current record storing page for storing indexed data has sufficient free space for storage of a new record defined by incoming transaction data.

Rows 3 and 4 of the decision data structure of Table A refer to the case where a recognized index change pattern is the index change pattern classification of batch appended non-uniform as depicted in case 2 described in reference to Table 4000 of FIG. 4.

FIGS. 7 and 8 illustrate that manager system 110 can return action decisions to initiate the creation of one or more leaf nodes in a manner that is dependent on an index change pattern classification. FIG. 7 depicts index structure 7000 and FIG. 8 depicts index structure 8000. Index structure 7000 includes additional structure 7010 added in the case that a predicted index change pattern classifier is the pattern of batch appended uniform. Index structure 8000 of FIG. 8 includes additional structure 8010 in the case that a predicted index change pattern classifier is the classifier batch appended non-uniform. Index structure 7000 can include leaf layer 7002, intermediate layer 7004, and root layer 7006 consisting of a root page. Index structure 8000 can include leaf page layer 8002, intermediate page layer 8004, and root page layer 8006 consisting of a root page.

Comparing area 8010 of FIG. 8 to area 7010 of FIG. 7, the added sections, respectively 8010 and 7010 can be differentiated in dependence on whether an index is predicted to exhibit a pattern classified as batch appended non-uniform or alternatively, batch appended uniform (FIG. 7). Area 7010 of FIG. 7 has pages of leaf page layer 7002 that are uniformly distributed with respect to their associated intermediate nodes. That is, each page of intermediate layer 7004 of added section 7010 has associated thereto a precise and consistent count of leaf pages, in the described example three leaf pages per intermediate page. However, the count of leaf pages that are associated to intermediate pages of intermediate page layer 8004 of index structure 8000 are differentiated. For example, with reference to FIG. 8, some intermediate layer pages of layer 8004 have associated thereto three leaf pages per intermediate page whereas the intermediate page of intermediate page layer 8004 within section 8012 has a single leaf page associated thereto, whereas the corresponding area 7012 of index structure 7000 has three leaf pages per intermediate layer page associated thereto. Section 8012 of index structure 8000 can be regarded as a sparse index structure section of index structure 8000. The location of the added section, 8010, the creation of which can be proactively initiated by manager system 110, can be in dependence on predicted locations of predicted added leaf pages returned by querying predictive model 3002, and specified in index location data of the decision data structure of Table A.

Figure 9:
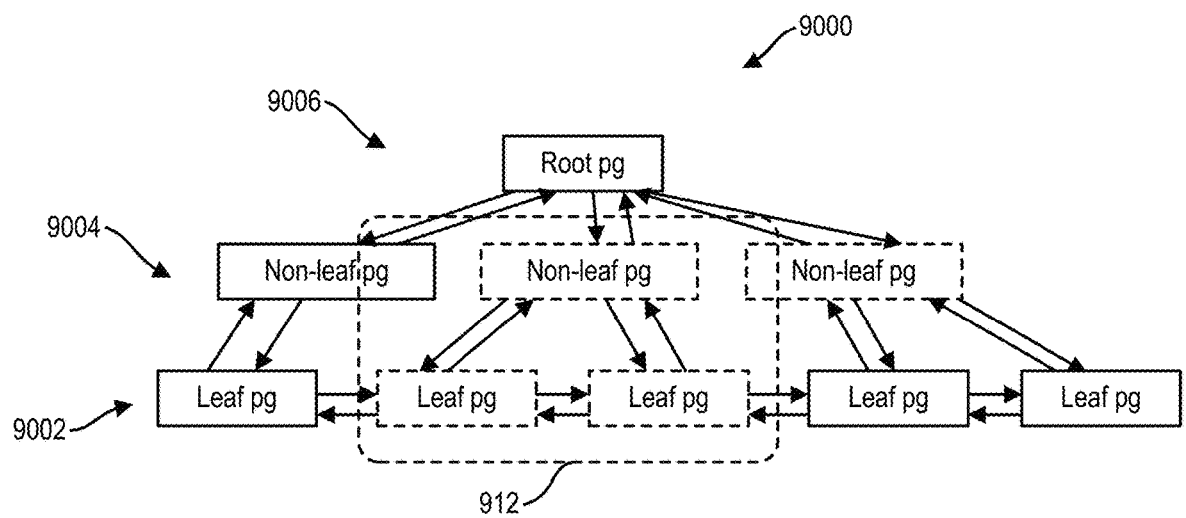
FIG. 9 is a schematic diagram illustrating predictive modification of an index according to one embodiment.

Referring to Rows 5 and 6 of the decision data structure of Table A, an index structure can be predicted to exhibit a batch distributed index change pattern as described in connection with case 3 of Table 4000 described in reference to FIG. 4. FIG. 9 depicts index structure 9000 being subject to modification be performance of an action decision of Row 5. The firing of Row 5, referring to the decision data structure of Table A, returns the action decision of proactively and asynchronously initiating creation of added leaf page(s) intermediate of a current first leaf page and current last page of an index to store expected records for a next time period of interest. Referring to FIG. 9, manager system 110 can initiate creation of additional leaf page(s) so that the additional leaf page(s) accommodate and store predicted expected transactions associated to certain locations of an index. For example, an index can be defined on a "cities" column and a spike of transactions can be predicted to occur with respect to city column values having the row value of Chicago. On return of the action decision of Row 5, manager system 110 can initiate creation of leaf page(s) in section 9012 of index structure 9000. Index structure 9000 can include leaf page layer 9002, intermediate layer 9004, and root page layer 9006 consisting of a root page. Added section 9012 as depicted, a single intermediate (non-leaf) page and first and second leaf page(s).

Initiating creation of a leaf page can include (a) allocating leaf page(s) to the index from a page repository; (b) linking the allocated leaf page(s) to related pages of the index, e.g. sibling and parent node pages; and (c) copying page split data from existing leaf page(s) to the newly created leaf page(s). It will be understood with reference to FIG. 9 that index structure 9000 as depicted in FIG. 9 refers to the case that the predicted added leaf page(s) column value for Row 5 specifies a count of two added leaf pages. In another example, the predicted added leaf page(s) column of Table A can specify one leaf page and in such a case, manager system 110 can return the action decision to initiate creation of a single additional leaf page in index structure 9000. In another example, the predicted added leaf page(s) column of Table A can specify N additional added leaf page(s) in which case the action decision returned on the firing of Row 5 can be configured so that manager system 110 initiates the creation of N additional leaf pages.

Referring to Row 6 of the decision data structure of Table A, Row 6 refers to the scenario where manager system 110, by querying of predictive model 3002 is unable to obtain data that specifies with a threshold exceeding level of confidence, a number of predicted count of added leaf pages or a location of added leaf pages but is able to return prediction specifying that specifies a prediction that a count of additional leaf pages in a specific section of an index will exceed 1. Also referring to Row 6, manager system 110 can return the prediction that an index change pattern will be the pattern batch distributed as described in case 3 of Table 4000 of FIG. 4.

It can be seen that index structure 9000 of FIG. 9 which includes additional leaf pages added intermediate a first leaf page and a last leaf page has a structure different from the index structure 5000 of FIG. 5 in which additional leaf pages are appended after a last leaf page of a current index structure. There is set forth herein according to one embodiment receiving by a database system 140 transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data. According to one embodiment, the prediction specifying data specifies a first index change classifier for the index, and a second index change classifier for a second index, wherein the modifying includes proactively modifying the index using the first index change classifier for the index, and proactively modifying the second index using the second index change classifier, wherein proactively modifying the index includes initiating creating a leaf page for the index appended at an end of index after a current end leaf page of the index, wherein proactively modifying the second index includes initiating creating a leaf page for the index added intermediate of a first leaf page and a last leaf page of the second index, wherein the first index change classifier is a classifier specifying that an index change pattern of the first index is an appended leaf page index change pattern, wherein the second index change classifier is a classifier specifying that an index change pattern of the second index is an distributed leaf page index change pattern.

Figure 10:
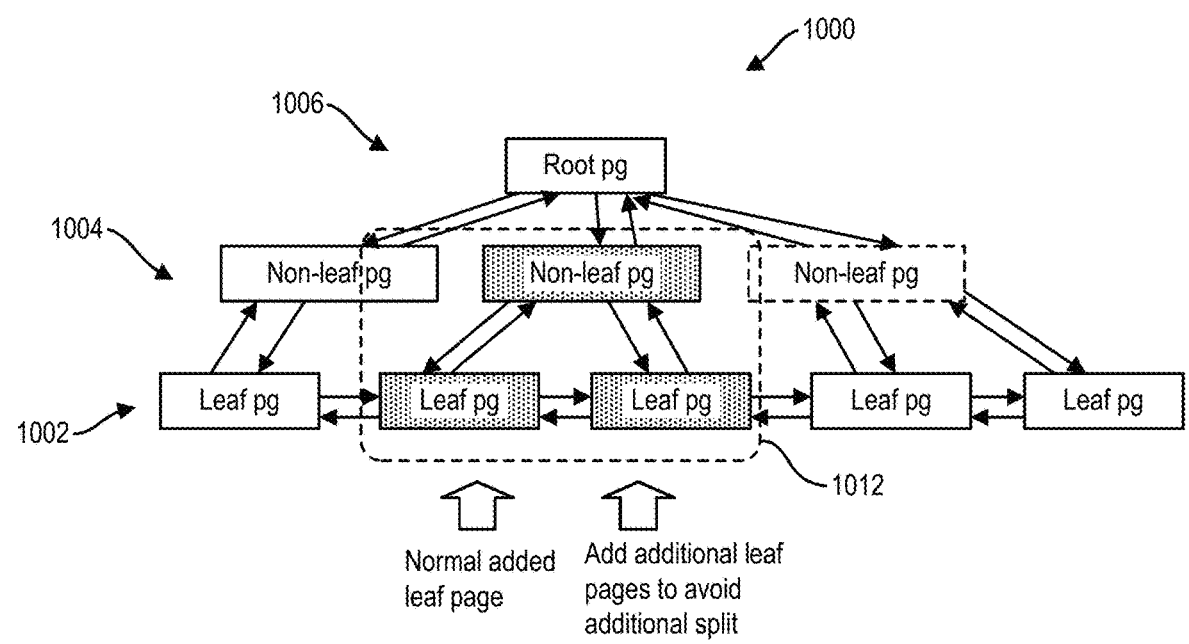
FIG. 10 is a schematic diagram illustrating predictive modification of an index according to one embodiment.

Referring to FIG. 10, FIG. 10 illustrates performance by manager system 110 of an action decision associated to Row 6. The action decision of Row 6 is the action decision to wait for an index split to be initiated in response to page free space check by IM, and synchronously allocates a first leaf page (per normal IM operation) and one or more additional leaf page (second, and possibly third, etc.) for performing index split in response to free space deficiency determination. Referring to Row 6, index manager (IM) can be configured to create an additional leaf page(s) for performance of an index split responsively and synchronously with respect to a determination that an existing record storing page has free space insufficient to store a new record defined by incoming transaction data.

Referring to Row 6 of the decision data structure of Table A, FIG. 10 depicts an index structure 1000 in the case Row 6 is fired. The firing condition for firing Row 6, is the firing condition that there is sufficient prediction specifying data to predict that more than one leaf page will be created during a next time period according to normal index manager (IM) operation, but the prediction specifying data is insufficient to determine the location for the additional leaf pages. For example, in the case the index is created for the column entitled "city", the city associated to the highest activity located section of the index can change randomly. In the case that manager system 110 can predict that multiple additional leaf pages will be created under normal operation of an index manager but does not predict a location of an index structure for the changes, an action decision can be fired as described in connection with Row 6 and FIG. 10. In accordance with the action decision described in reference to Row 6 and FIG. 10, creation of a leaf page can be synchronous and responsive to a determination that an existing record storing page for storing indexed data has insufficient free space to store a new record defined by incoming transaction data and initiation of page creation for performance of an index split is not prior to and synchronous with the free space deficiency determination as in the action decisions of Rows 1-5. The index structure 1000 as shown in FIG. 10 includes leaf page layer 1002, intermediate page layer 1004, and root page layer 1006 consisting of a root page.

According to the action decision described in FIG. 10 and Row 6, the added section 1012 of index structure 1000 can be added responsively to the same triggering condition that triggers the creation of a leaf node according to normal index split operation performed by an index manager (IM). That is, according to the action decision described with reference to FIG. 10, an index manager (IM) can initiate creation of first and second leaf pages depicted within section 1012 in response to the determination that an existing page of index structure 1000 has insufficient free space to store a new data record defined by incoming transaction data. The action decision of FIG. 10 presents a modification with respect to normal index split operation performed by an index manager (IM).

According to normal index split operation performed by an index manager (IM), a single leaf page can be created in response to a determination that a certain existing record storing page has insufficient free space to store a new record defined by incoming transaction data. However, according to the modification described with reference to FIG. 10, an index manager (IM) can initiate creation of one or more additional leaf pages (depending on the predicted count of additional leaf pages specified in the predicted added leaf pages column of Table A). Initiating creating an additional one or more leaf page, shown in FIG. 10, in response to an index split condition being observed avoids a need to perform multiple index splits and succession and improves response time of database 138. Initiating creating of an additional leaf page within section 1012 as depicted in FIG. 10 can include one or more or (a) allocating a page to the index structure 1000 at the appropriate location from a page repository; (b) linking the new page to existing related pages of the index structure 1000, e.g. sibling and parent pages; and (c) copying record data from an existing page to the newly allocated leaf page. The action described with reference to Row and FIG. 10 describes aggressively initiating creation of multiple index leaf pages in response to a determination that a record storing page for storing indexed column data has insufficient free space to store an incoming record.

There is set forth herein according to one embodiment receiving by a database system 140 transaction data from client computer devices, the transaction data defined by insert query data; changing a structure of an index of a certain table of the database system in response to the receiving; generating logging data in response to the receiving of the transaction data; providing using the logging data prediction specifying data, the prediction specifying data specifying one or more change predicted to occur with respect to the index; and modifying the index in dependence on the prediction specifying data. According to one embodiment, wherein the prediction specifying data specifies that more than one leaf page for the index will be created, and wherein the modifying includes synchronously initiating creating of first and second leaf pages in response to a determination that a certain leaf page of the index has insufficient free space to store incoming transaction data.

Referring to Rows 7 and 8 of the decision data structure of Table A, the action decisions associated to Rows 7 and 8 can be as described with reference to FIGS. 9 and 10 herein. For example, with respect to Row 7, if the index location has been predicted an action decision can be performed to initiate creation of one or more leaf page within added section 9012 of index structure 9000. Referring to Row 8, in the case it is predicted that expansion of index structure 1000 by more than one leaf page will occur, but at an unknown location, the action decision as described in reference to FIG. 10, i.e. synchronously performed responsively to a determination that an existing page has insufficient free space to store a new record defined by incoming transaction data can be performed.

Referring again to the flowchart of FIG. 2, manager system 110 in response to return of an action decision using the decision data structure of Table A can proceed to block 1105 to provide one or more output for performance of the action specified in the action decision. According to one embodiment, manager system 110 at block 1105 can send command data for performance by database 138. In response to receipt of the command data at block 1405, database 138 can perform one or more command specified by the command data for performance of the action decision.

Figure 11:
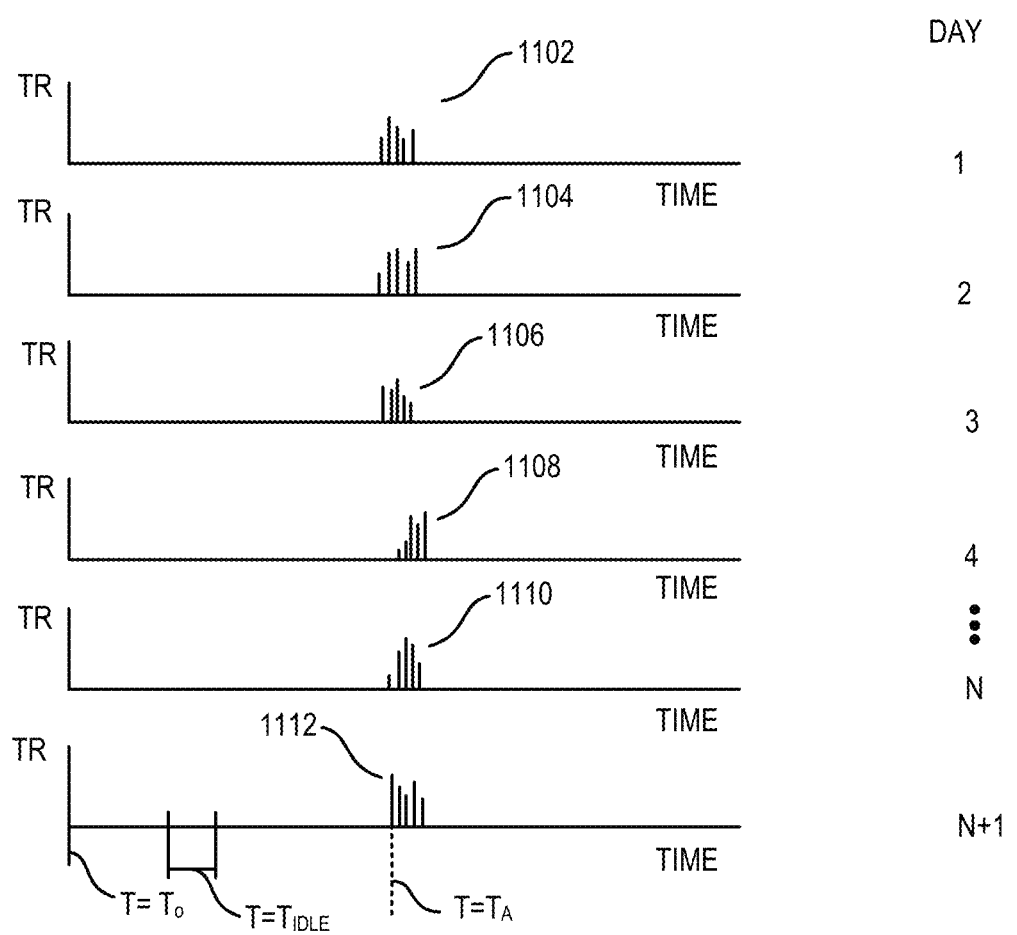
FIG. 11 is a timing diagram illustrating timing associated to predictive modification of an index according to one embodiment.

FIG. 11 shows a timing diagram illustrating timing operations by which an index manager (IM) can perform an action decision as specified, e.g. in Rows 1-5 and Row 7 in the decision data structure of Table A, wherein an index manager (IM) proactively and asynchronously initiates creation of a leaf page for performance of an index split. Referring to the timing diagram of FIG. 11, manager system 110 can perform block 1104 to perform querying of a predictive model such as predictive model 3002 (FIG. 3) and a decision data structure such as the decision data structure of Table A for return of an action decision at time $T_0$. Time $T_0$ can be the commencement of time period interest in a succession of time periods. The timing diagram of FIG. 11 depicts timing data for the case that a time period of interest is one day. However, another time period can be selected and multiple time periods can be used concurrently. According to one embodiment, an index manager (IM) based on command data received from manager system 110 can initiate creation of one or more data page for performance of an index split during an idle time period, such as the idle time period depicted in FIG. 11 of $T=T_{IDLE}$.

Referring to the timing diagram of FIG. 11, different timelines are illustrated for different successive time periods of interest, i.e. day 1, day 2, day 3, day 4, to day N and also day N+1. In the described example of FIG. 11, days 1 ough N can be successive time periods of interest in which the predictive model, such as predictive model 3002, for use in return of action decisions can be trained by application of training data as set forth herein wherein a training dataset is generated for each time period of interest and applied to the predictive model. In the described example, subsequent to day N, the trained predictive model 3002 can pass a criterion, e.g. as described in connection with block 1103 permitting predictive model 3002 to be deployed for use in the return of action decision. In the described example, day N+1 can be the first day that predictive model 3002 is used for return of an action decision. Referring to FIG. 11, increased activity periods 1102, 1104, 1106, 1108, 1110, and 1112 are period of increased transaction activity experiences by database system 140 during the time periods of the respective timelines associated to day 1, day 2, day 3, day 4, day N, and day N+1 respectively.

Referring again to the decision data structure of Table A, an index manager (IM) based on command data received from manager system 110 can proactively and asynchronously initiate creation of one or more leaf page for performance of an index split when various rows, such as Rows 1-5, 7 are fired. According to one embodiment, as set forth in reference to the timing diagram of FIG. 11, an index manager (IM) can initiate creation of a leaf page for performance of an index split in accordance with Rows 1-5, 7 during an idle time of database 138. An idle time is depicted in the timing diagram of FIG. 11 on the timeline of day N+1 as idle time $T=T_{IDLE}$.

Manager system 110 can perform various processes to determine an idle time of database 138. According to one embodiment, an idle time of database 138 can be defined as a time at which database 138 receives queries defined by transaction data from client computer devices 130A-130Z at a rate below a threshold rate. Accordingly, manager system 110 for performance of block 1105 can examine transaction logging data received at block 1101 and can identify that a current time is an idle period of database 138 based on a rate of transaction data defined by queries received from client computer devices 130A-130Z falling below a low threshold. When manager system 110 determines that a current time is an idle time, manager system 110 for performance of block 1105 can send a communication for receipt by database system 140 so that an index manager (IM) of database system 140 can initiate creation of a leaf page as set forth herein during a determined idle time $T=T_{IDLE}$, of database 138. In addition or alternatively, manager system 110 can determine a predicted idle time of database 138 by querying predictive model 3002 once predictive model 3002 is trained. An index manager (IM) of DBMS 1400 initiating creating of one or more leaf page can include (a) allocating the one or more leaf page to the index from a page store, (b) linking the one or more leaf page to related leaf pages of the index, and (c) copying page split data from an existing one or more leaf page of the index to the one or more leaf page.

With further reference to the timeline associated to day N+1, an index manager (IM) can respond to increased transaction activity period 1112 at time $T=T_4$. Index manager (IM) during normal operation in the absence of features herein deployed would at time $T=T_4$ respond to increased transaction activity at time $T=T_4$, by performance of an index split to (a) allocate new leaf page(s) from a page repository for performance of the index split; (b) link the new leaf page(s) to related leaf pages, e.g. sibling and parent leaf pages of the current index structure; and (c) copy record data of an existing leaf page to the newly allocated leaf page(s). However, in accordance with features set forth herein, one or more of the actions associated with an index split, namely, one or more of (a), (b), and/or (c) have previously been performed prior to $T=T_4$ at idle time $T=T_{IDLE}$. Accordingly, a response time of database system 140 in responding to increased transaction activity indicated by increased transaction activity period, 111, is significantly improved over a response time in the absence of features set forth herein.

Table B depicts performance improvements for that case that 10M records are inserted into a database table having indexes defined on five columns. In Table B a comparison is made between operation of (a) a database configured according to normal operation wherein leaf pages are allocated synchronously and responsively to a determination that there is insufficient free space on a record storing page, and (b) a database configured to pre-allocate new leaf pages to an index prior to a determination that there is insufficient free space on a record storing page, and.

TABLE B

| Action | No Pre-Allocate | Pre-Allocate | Improve |
|---|---|---|---|
| CPU time | 0.003357 | 0.002883 | 0.000474 |
| IRLM LOCK and LATCH | 0.0012415 | 0.0066735 | −0.005432 |
| SYSTEM LATCH | 0.024449 | 0.0005345 | 0.023915 |
| DATABASE I/O | 0.000026 | 0.0012 | −0.001174 |
| LOG WRITE I/O | 0.0091 | 0.004323 | 0.004777 |
| OTHER READ I/O | 0.0016665 | 0.001569 | 0.000097 |
| OTHER WRITE I/O | 0.000334 | 0.0004435 | −0.000110 |
| OPEN/CLOSE | 0.0000105 | 0.0000065 | 0.000004 |
| EXT/DEL/DEF | 0.000296 | 0.000062 | 0.000234 |
| PAGE LATCH | 0.0039345 | 0.013775 | −0.009841 |
| GLOBAL CONTENTION | 0.007703 | 0.000839 | 0.006864 |
| SUM | 0.052118 | 0.032309 | 0.019809 |

Figure 12:
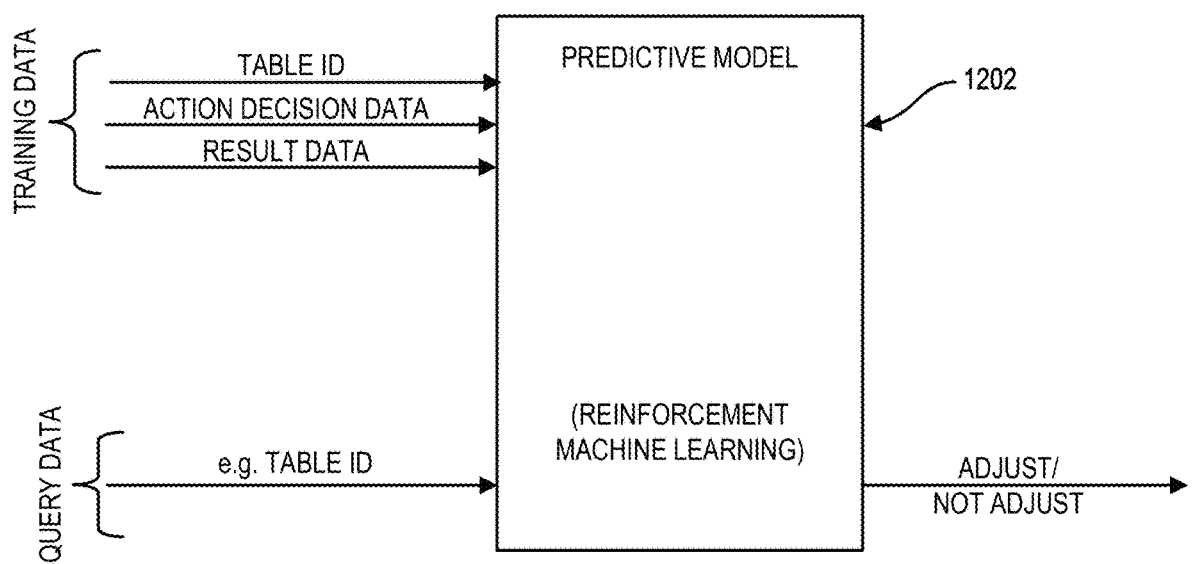
FIG. 12 is a schematic diagram illustrating training of a predictive model according to one embodiment.

Predictive models for use by system 100 for return of action decisions can include predictive models trained by reinforcement machine learning processes. FIG. 12 depicts predictive model 1202 that is trained by reinforcement machine learning processes. According to one embodiment, system 100 can be configured so that after performance of an action decision by an index manager (IM), manager system 110 can monitor performance of an action in accordance with the returned action decision and can score the action as being positive or negative. For example, an action to proactively initiate creation of a leaf page can be scored negatively if the leaf page for which creation is initiated proactively stores no new record data during a next time period. Referring to predictive model 1202, predictive model 1202 can be trained with use of training data and once trained can respond to query data. The training data can include, e.g. as depicted in FIG. 12 a table ID associated with action decision data of a certain time period and result data specifying a result of implementation of an action specified by the action decision data, e.g. which can be scored negatively if, for example, a leaf page for which creation is initiated proactively does not store new record data. Predictive model 1202, once trained, can respond to query data. Query data can include, e.g. a table ID.

System 100 can be configured so that at block 1104, when manager system 110 queries the decision data structure of Table A, manager system 110 queries predictive model 1202 to determine a prediction as to whether the action decision of Table A will be accurate or not. Querying of predictive model 1202 with query data predictive model 1202 can return to manager system 110 and can make a decision as to whether to adjust or not adjust an action decision of Table A associated to a certain Row. Predictive model 1202 in response to a query, can return an action decision to adjust a specified action decision of Table A. In the case predictive model 1202 has been trained with training data indicating that a table associated to predictive model 1202 has been performing negatively. Accordingly, system 100 can be configured so that if predictive model 1202 returns a decision to adjust an action decision specified in Table A, manager system 110 prior to firing a Row of Table A, can decrement a count of leaf pages that are specified for creation initiation in accordance with an action decision specified in Table A.

Predictive model 1202 can be iteratively trained with training data during training data block 1102. Referring to the action decisions of the decision data structure of Table A, leaf pages specified for creation initiation can be in accordance with a predicted count of added leaf pages specified in the added leaf pages column of Table A. System 100 can be configured so that when predictive model 1202, as explained herein, returns an adjust decision, a count of leaf pages for creation initiation in accordance with the count specified in the added leaf page column of Table A is decremented by 1.

On return of an action decision at block 1104, manager system 110 can proceed to block 1105. At block 1105, manager system 110 can provide one or more output for performing the action decision returned at block 1104. As specified in the decision data structure of Table A, an action decision can include an action decision to modify and index structure. At block 1105, according to one embodiment, manager system 110 can send a communication to database system 140 which communication can be received by database system 140 at block 1405. Database system 140 on receipt of a communication at block 1405 can perform one or more action specified in a returned action decision returned at block 1104. Manager system 110 on completion of block 1105 can return to block 1101 to receive and store additional logging data which has been iteratively sent by database system 140 at block 1404. It can be seen that manager system 110 can iteratively perform the loop of blocks 1101-1105.

Various available tools, libraries, and/or services can be utilized for implementation of predictive models herein. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Figure 13:
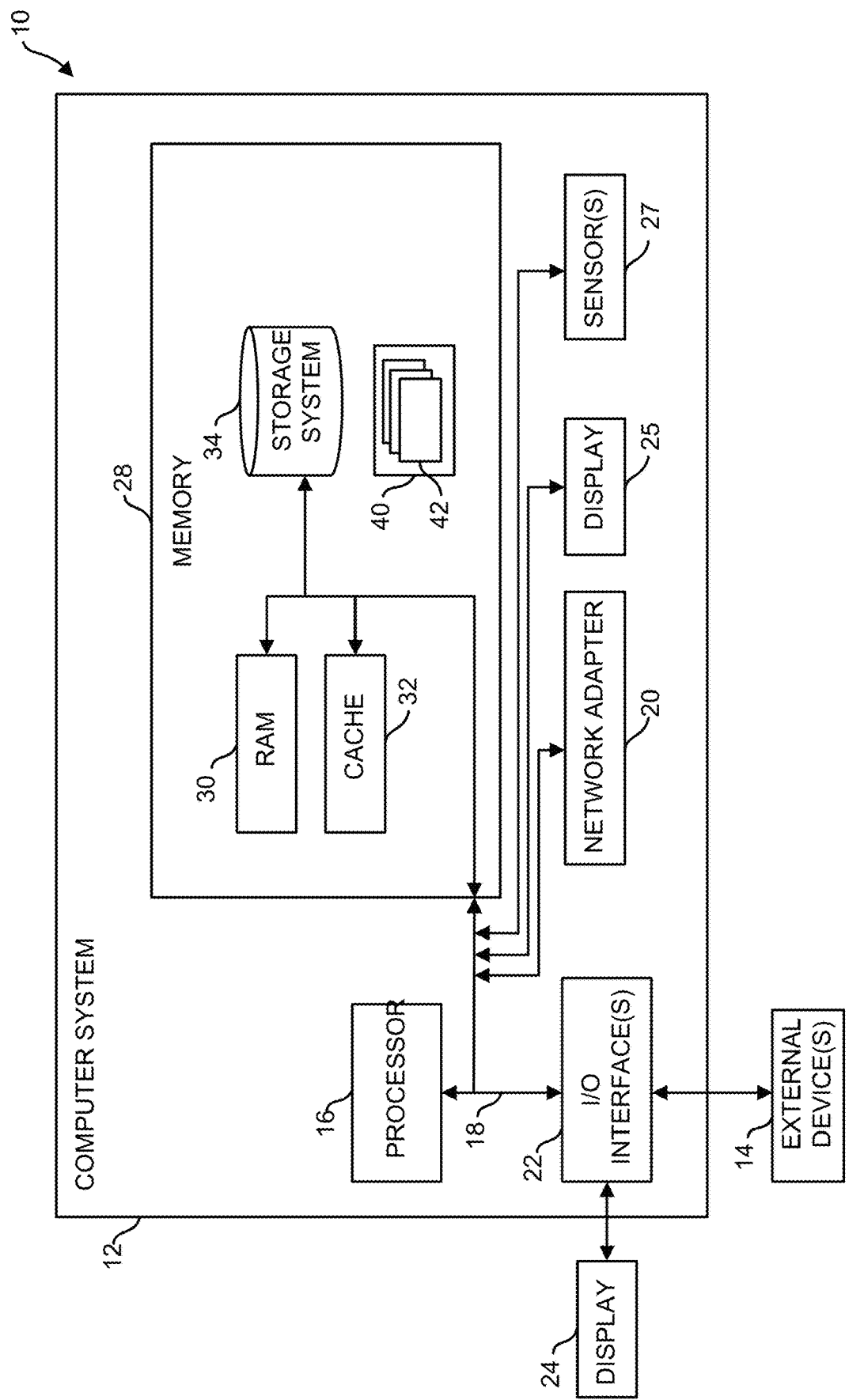
FIG. 13 depicts a computing node according to one embodiment.
Figure 14:
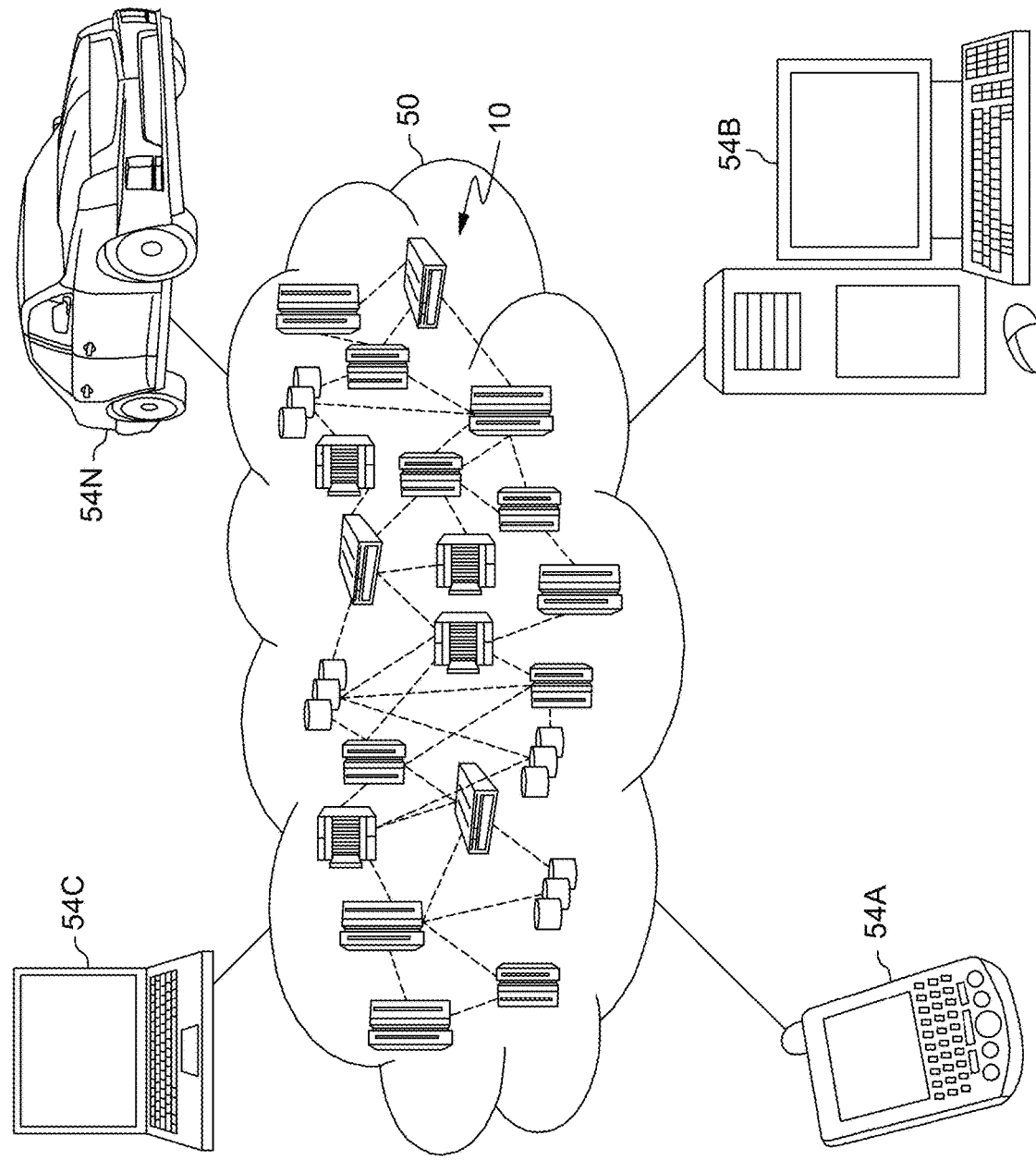
FIG. 14 depicts a cloud computing environment according to one embodiment.
Figure 15:
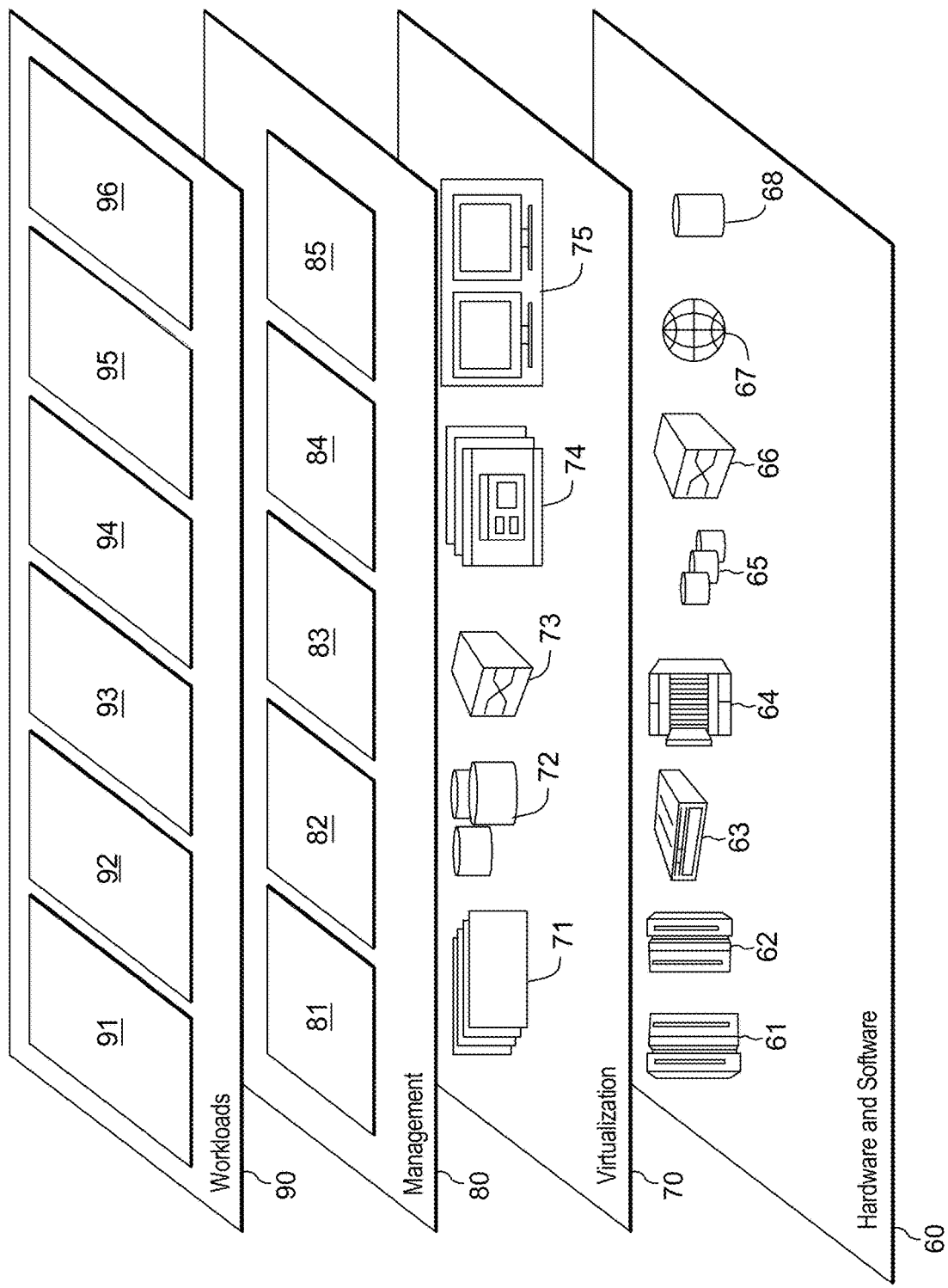
FIG. 15 depicts abstraction model layers according to one embodiment.

Certain embodiments herein may offer various technical computing advantages involving computing advantages to address problems arising in the realm of computer networks and computer systems. Embodiments herein can improve the performance of a computer system database. Embodiments herein can include machine learning processing so that index change patterns can be learned and predicted. According to one embodiment, in response to predicting of an index change pattern an index manager can, asynchronously to determining that a record storing page has insufficient free space to store a record, perform one or more index split action. The one or more action can include (a) allocating a leaf page from a page store to an index, (b) linking the leaf page to related index pages, and (c) copying page split data to the new leaf page. According to one aspect response time can be improved in databases in their performance of index splits. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 13-15 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 13, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 14-15.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for functions described with reference to manager system 110 as set forth in the flowchart of FIG. 2. In one embodiment, one or more client computer device 130A-130Z can include one or more computing node 10 and can include one or more program 40 for performing functions described with reference to one or more client computer device 130A-130Z as set forth in the flowchart of FIG. 2. In one embodiment, database system 140 can include one or more computing node 10 and can include one or more program 40 for performing functions described with reference to database system 140 as set forth in the flowchart of FIG. 2. In one embodiment, the computing node based systems and devices depicted in FIG. 1 can include one or more program 40 for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 14 computing node 10 is described as being implemented in a cloud computing environment and accordingly is referred to as a cloud computing node in the context of FIG. 14.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for predictive database index modification as set forth herein. The processing components 96 can be implemented with use of one or more program 40 described in FIG. 13.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   receiving by a database system transaction data from client computer devices, the transaction data defined by insert query data;
   changing a structure of an index of a certain table of the database system in response to the receiving;
   generating logging data in response to the receiving of the transaction data;
   providing using the logging data prediction specifying data, the prediction specifying data specifying one or more change predicted to occur with respect to the index; and
   modifying the index in dependence on the prediction specifying data.

2. The computer implemented method of claim 1, wherein the prediction specifying data specifies a classifier of an index change pattern, and wherein the modifying includes proactively modifying the index using the classifier of the index change pattern.

3. The computer implemented method of claim 1, wherein the prediction specifying data specifies a count of leaf pages predicted to be added, and wherein the modifying includes proactively initiating creation of one or more leaf page for the index according to the count.

4. The computer implemented method of claim 1, wherein the modifying includes proactively allocating one or more leaf page for accommodation of page split data of a certain page of the index.

5. The computer implemented method of claim 1, wherein the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data.

6. The computer implemented method of claim 1, wherein the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data, the proactively initiating creating including performing, prior to the determination that free space of one or more certain leaf page of the index is insufficient to store incoming transaction data, one or more of (a) allocating the one or more leaf page to the index from a page store, (b) linking the one or more leaf page to related leaf pages of the index, and (c) copying page split data from an existing one or more leaf page of the index to the one or more leaf page.

7. The computer implemented method of claim 1, wherein the prediction specifying data specifies that more than one leaf page for the index will be created, and wherein the modifying includes synchronously initiating creating of first and second leaf pages in response to a determination that a certain leaf page of the index has insufficient free space to store incoming transaction data.

8. The computer implemented method of claim 1, wherein the providing the prediction specifying data includes querying a predictive model that has been subject to training by machine learning using the logging data.

9. The computer implemented method of claim 1, wherein the providing the prediction specifying data includes querying a predictive model that has been subject to training by machine learning using the logging data, wherein training of the predictive model includes applying for successive time periods a training data set, the training data set including for respective time periods transaction data, index change data, a table ID, and an index change pattern classifier.

10. The computer implemented method of claim 1, wherein the prediction specifying data specifies a first index change classifier for the index, and a second index change classifier for a second index, wherein the modifying includes proactively modifying the index using the first index change classifier for the index, and proactively modifying the second index using the second index change classifier, wherein proactively modifying the index includes initiating creating a leaf page for the index appended at an end of index after a current end leaf page of the index, wherein proactively modifying the second index includes initiating creating a leaf page for the index added intermediate of a first leaf page and a last leaf page of the second index, wherein the first index change classifier is a classifier specifying that an index change pattern of the first index is an appended leaf page index change pattern, wherein the second index change classifier is a classifier specifying that an index change pattern of the second index is an distributed leaf page index change pattern.

11. The computer implemented method of claim 1, wherein the generating logging data in response to the receiving of the transaction data includes generating index logging data that specifies the generation of new indexes and new index pages, and wherein the providing using the logging data prediction specifying data includes providing using the index logging data the prediction specifying data.

12. The computer implemented method of claim 1, wherein the prediction specifying data specifies the prediction that a certain count of intermediate pages and that a particular count of leaf pages will be added to the index.

13. A computer program product comprising:
    a computer readable storage medium readable by one or more processing circuit and storing instructions for execution by one or more processor for performing a method comprising:
    receiving by a database system transaction data from client computer devices, the transaction data defined by insert query data;
    changing a structure of an index of a certain table of the database system in response to the receiving;

generating index logging data in response to the receiving of the transaction data;

providing using the index logging data prediction specifying data, the prediction specifying data specifying one or more page generation change predicted to occur with respect to the index; and modifying the index in dependence on the prediction specifying data.

14. The computer program product of claim 13, wherein the prediction specifying data specifies a classifier of an index change pattern, and wherein the modifying includes proactively modifying the index using the classifier of the index change pattern.

15. The computer program product of claim 13, wherein the prediction specifying data specifies a count of leaf pages predicted to be added, and wherein the modifying includes proactively initiating creation of one or more leaf page for the index according to the count.

16. The computer program product of claim 13, wherein the modifying includes proactively allocating one or more leaf page for accommodation of page split data of a certain page of the index.

17. The computer program product of claim 13, wherein the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data.

18. The computer program product of claim 13, wherein the modifying includes proactively initiating creating one or more leaf page for accommodation of page split data of one or more certain leaf page of the index, wherein the proactively initiating creating includes asynchronously initiating creating the one or more leaf page prior a determination that free space of one or more certain leaf page of the index is insufficient to store incoming transaction data, the proactively initiating creating including performing, prior to the determination that free space of one or more certain leaf page of the index is insufficient to store incoming transaction data, each of (a) allocating the one or more leaf page to the index from a page store, (b) linking the one or more leaf page to related leaf pages of the index, and (c) copying page split data from an existing one or more leaf page of the index to the one or more leaf page.

19. The computer program product of claim 13, wherein the prediction specifying data specifies that more than one leaf page for the index will be created, and wherein the modifying includes synchronously initiating creating of first and second leaf pages in response to a determination that a certain leaf page of the index has insufficient free space to store incoming transaction data.

20. A system comprising:

a memory;

at least one processor in communication with the memory; and program instructions executable by one or more processor via the memory to perform a method comprising:

receiving by a database system transaction data from client computer devices, the transaction data defined by insert query data;

changing a structure of an index of a certain table of the database system in response to the receiving the transaction data, wherein the changing the structure of the certain table of the database system in response to the receiving the transaction data includes adding a page to the index of the certain table in response to the receiving the transaction data;

generating logging data in response to the receiving of the transaction data;

providing using the logging data prediction specifying data, the prediction specifying data specifying one or more change predicted to occur with respect to the index; and modifying the index in dependence on the prediction specifying data.

* * * * *